United States Patent
Li et al.

(10) Patent No.: US 9,819,720 B2
(45) Date of Patent: Nov. 14, 2017

(54) SYSTEM AND METHOD TO CORRELATE LOCAL MEDIA URIS BETWEEN WEB BROWSERS

(71) Applicant: Futurewei Technologies Inc., Plano, TX (US)

(72) Inventors: Li Li, Bridgewater, NJ (US); Wen Chen, Kearny, NJ (US); Zhe Wang, Piscataway, NJ (US); Wu Chou, Basking Ridge, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 308 days.

(21) Appl. No.: 14/514,163

(22) Filed: Oct. 14, 2014

(65) Prior Publication Data

US 2015/0106527 A1 Apr. 16, 2015

Related U.S. Application Data

(60) Provisional application No. 61/985,235, filed on Apr. 28, 2014, provisional application No. 61/890,766, filed on Oct. 14, 2013.

(51) Int. Cl.
*H04L 29/08* (2006.01)
*G06F 17/30* (2006.01)

(52) U.S. Cl.
CPC ........ *H04L 67/02* (2013.01); *G06F 17/30861* (2013.01); *H04L 67/2814* (2013.01)

(58) Field of Classification Search
CPC .................. H04L 67/02; H04L 67/2814; G06F 17/30861
See application file for complete search history.

(56) References Cited

U.S. PATENT DOCUMENTS

| 8,554,710 | B2* | 10/2013 | Neely, III | G06F 17/30734 706/45 |
| 2002/0169868 | A1* | 11/2002 | Lopke | G06F 11/3419 709/224 |
| 2003/0088558 | A1* | 5/2003 | Zaharioudakis | G06F 17/30457 |
| 2004/0210552 | A1* | 10/2004 | Friedman | G06F 17/30864 |
| 2007/0140442 | A1* | 6/2007 | McCormack | H04L 12/5835 379/88.1 |
| 2007/0198564 | A1* | 8/2007 | Blackstone | G06F 17/30557 |
| 2008/0222087 | A1* | 9/2008 | Balmin | G06F 17/30935 |

(Continued)

*Primary Examiner* — Dustin Nguyen
*Assistant Examiner* — Javier O Guzman
(74) *Attorney, Agent, or Firm* — Vierra Magen Marcus LLP

(57) ABSTRACT

Various disclosed embodiments include methods and systems for correlating local media uniform resource identifiers (URIs) between a first web browser of a first user device and a second web browser of a second user device. The method comprises establishing a session between the first web browser, the second web browser, and a server. The method comprises performing an action related to a first URI on the first web browser. The method comprises encoding the performed action as a resource description framework (RDF) graph including the first URI and sending the RDF graph to the server. The method comprises translating the received RDF graph to a second RDF graph including a second URI based on a <mirror> predicate stored in the server. The method comprises sending the second RDF graph to the second browser.

15 Claims, 7 Drawing Sheets

(56) References Cited

U.S. PATENT DOCUMENTS

| | | | | |
|---|---|---|---|---|
| 2011/0055322 A1* | 3/2011 | Gregersen | ......... | H04L 29/12103 709/203 |
| 2011/0078166 A1* | 3/2011 | Oliver | ............... | G06F 17/30864 707/760 |
| 2011/0276157 A1* | 11/2011 | Wang | ................ | G06F 17/30861 700/94 |
| 2012/0124478 A1* | 5/2012 | King | ................. | G06F 17/30943 715/738 |
| 2012/0254102 A1* | 10/2012 | Li | ......................... | G06Q 10/10 706/58 |
| 2013/0311517 A1* | 11/2013 | Kementsietsidis | ........................ | G06F 17/30533 707/798 |
| 2014/0101527 A1* | 4/2014 | Suciu | .................... | G06F 17/218 715/230 |
| 2014/0219167 A1* | 8/2014 | Santhanam | ....... | H04W 28/0268 370/328 |

* cited by examiner

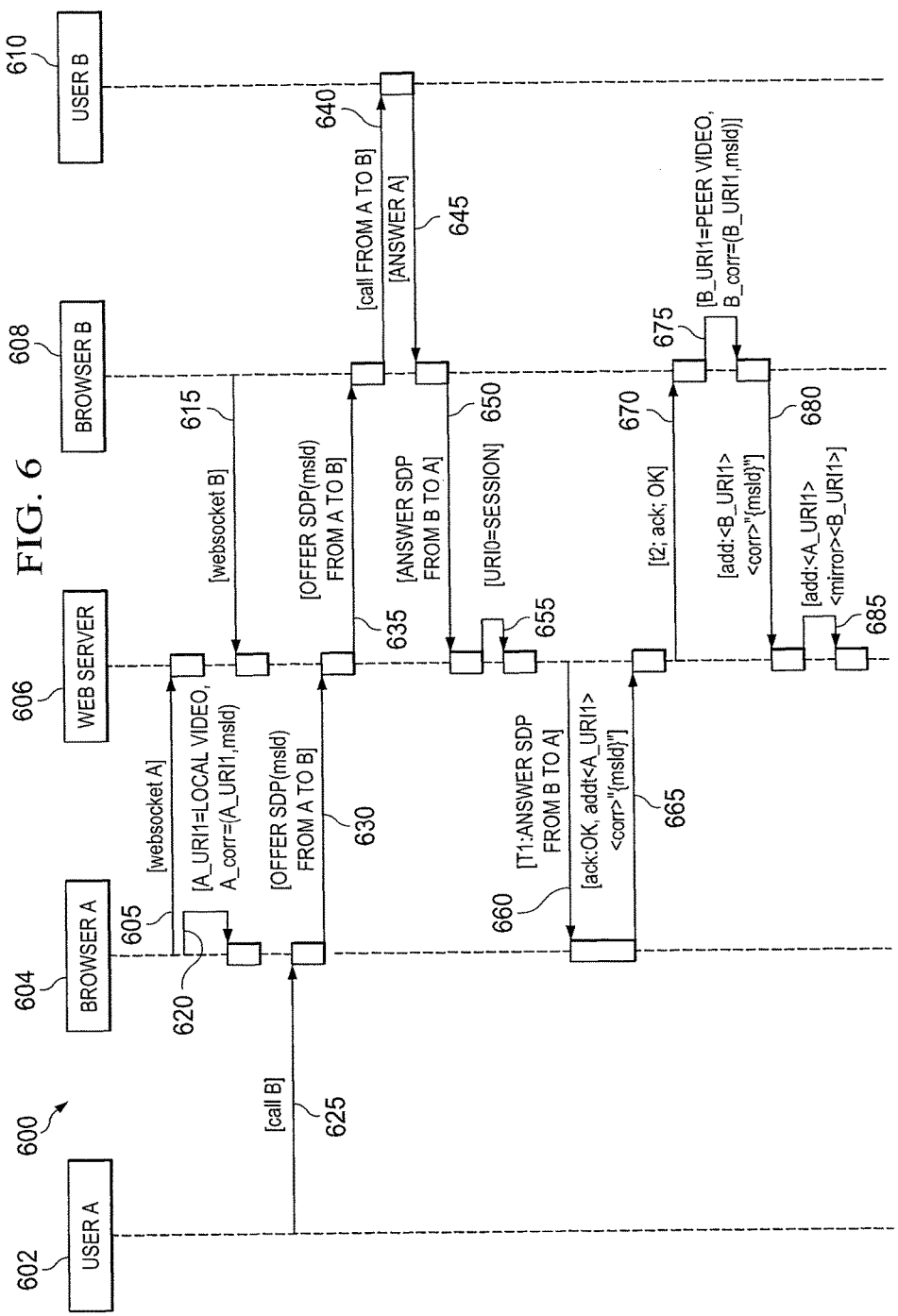

SYSTEM AND METHOD TO CORRELATE LOCAL MEDIA URIS BETWEEN WEB BROWSERS

CROSS-REFERENCE TO RELATED APPLICATIONS

The present application claims priority to U.S. provisional Application No. 61/985,235 filed on Apr. 28, 2014 and claims priority to U.S. provisional Application No. 61/890,766 filed on Oct. 14, 2013, both of which are incorporated herein by reference.

TECHNICAL FIELD

The present disclosure relates generally to communication between web browsers, and more particularly, to correlating local media uniform resource identifier (URIs) between web browsers.

BACKGROUND

WebRTC (Web Real Time Communication) is an open source protocol for establishing media channels between users. Linked hypermedia (graphics, audio, video, plain text and hyperlinks) enrich the content of these channels. Users can accurately cross-link relevant web information, regardless of its location and format, using spatial and temporal descriptions. Examples are: (1) this rectangle area of the real-time video frame is related to this person's home page, (2) this segment of audio conversation is related to this Google map, (3) this segment of the call is related to this Wikipedia page, and (4) this segment of video lecture is related to this part of the YouTube video.

The linked hypermedia creates not only new meaning, but also new communication modalities: users can co-edit a linked Wikipedia page, users can co-browsing a linked Google map, and users can co-view a linked YouTube video.

The linked hypermedia can be created by users or computer programs, such as where each user collaboratively contributes his knowledge, a computer program brings in new information according to scheduled topics, or a computer program augments conversation in real-time (e.g., based on automated face recognition and/or automated speech recognition).

Real-time media access and control in web browsers can be accomplished or performed using various interfaces/specifications, including WebRTC application programming interface (API), HTML5 media API, Stream Processing API, Web Audio API, Mozilla Audio Data API, Media Controller API, Media Capture API, and HTML5 Media Capture API.

Multimodal interactions in real and virtual environments may be accomplished or performed in accordance with various specifications, such as World Wide Web (W3C) VXML 3.0, W3C Multimodal Architecture and Interface, W3C Emma, W3C SCXML, W3C InkML, W3C EmotionML, W3C SMIL, and Web Real-Time 3D.

Various problems exist in the current art in this field. Media URIs generated by a web browser are local and only resolvable by the browser, and are temporary and will become invalid after the browser exits. In addition, two communicating web browsers generate different URIs for related media streams. For example, browser A assigns the video from camera A_URI for a local view, while browser B assigns the video from A's camera B_URI for peer view. In this case, the A_URI and the B_URI have no common part for correlation. Further, in a collaborative multi-user conference, when an action is performed on A_URI at browser A, how is it known that it should be performed on B_URI at browser B, when each browser has many media streams?

The present disclosure provides various methods, mechanisms, and techniques to establish correlations between local media URIs during a WebRTC call, record the correlations as resource description framework (RDF) <mirror> predicates in an RDF store, and translate RDF graphs exchanged between web browsers based on the RDF <mirror> predicates.

SUMMARY

According to one embodiment, there is provided a method of correlating local media uniform resource identifiers (URIs) between a first web browser of a first user device and a second web browser of a second user device. The method comprises establishing a communication session between the first web browser, the second web browser, and a server. The method comprises performing an action related to a first URI on the first browser. The method comprises encoding the performed action as a resource description framework (RDF) graph including the first URI and sending the RDF graph to the server. The method comprises translating the received RDF graph to a second RDF graph including a second URI based on a <mirror> predicate stored in the server. The method comprises sending the second RDF graph to the second browser.

In another embodiment, there is provided a method of translating a resource description framework (RDF) graph. The method comprises, at a server, establishing a session between a first web browser, a second web browser, and the server. The method comprises receiving, from the first browser, an encoded RDF graph that includes a first uniform resource identifier (URI). The method comprises translating the received RDF graph to a second RDF graph including a second URI based on a <mirror> predicate stored in the server, and sending the second RDF graph to the second browser.

In another embodiment, there is provided an apparatus to translate a resource description framework (RDF) graph. The apparatus comprises a processor, and memory coupled to the processor. The apparatus is configured to establish a session between a first web browser, a second web browser, and the apparatus. The apparatus is configured to receive, from the first browser, an encoded RDF graph that includes a first uniform resource identifier (URI). The apparatus id configured to translate the received RDF graph to a second RDF graph including a second URI based on a <mirror> predicate stored in the server, and to send the second RDF graph to the second browser.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 illustrates a call flow diagram of a system for URI correction during a WebRTC call according to one embodiment;

DETAILED DESCRIPTION

Figure 1:
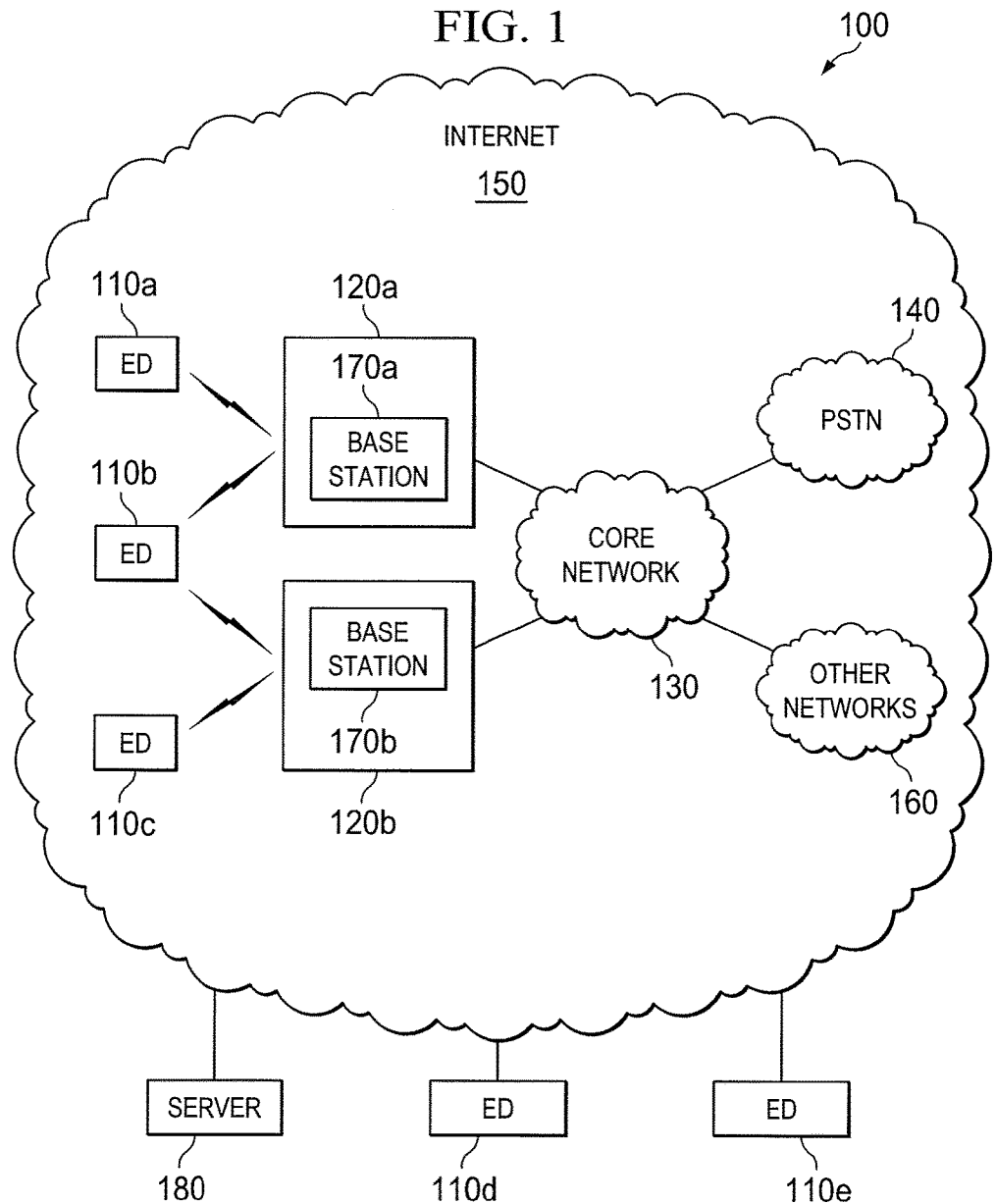
FIG. 1 illustrates a diagram of an illustrative communication system that can implement WebRTC calls and correlate local media URIs between multiple browsers within user devices according to one embodiment.

FIG. 1 illustrates an example communication system 100 that can implement WebRTC calls and correlate local media URIs between multiple browsers within electronic devices. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110e, radio access networks (RANs) 120a-120b, a core network 130, a public switched telephone network (PSTN) 140, the Internet 150, and other networks 160, and one or more servers 180. While certain numbers of these components or elements are shown in FIG. 1, any number of these components or elements may be included in the system 100.

The EDs 110a-110e are configured to operate and/or communicate in the system 100. For example, the EDs 110a-110e are configured to transmit and/or receive via wireless or wired communication channels. Each ED 110a-110e represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device, all which include and incorporate a browser application.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. EDs 110d-110e are configured to interface and communicate with the internet 150 and may access the core network 130, the PSTN 140, and/or the other networks 160, which may include communicating with the server 180.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
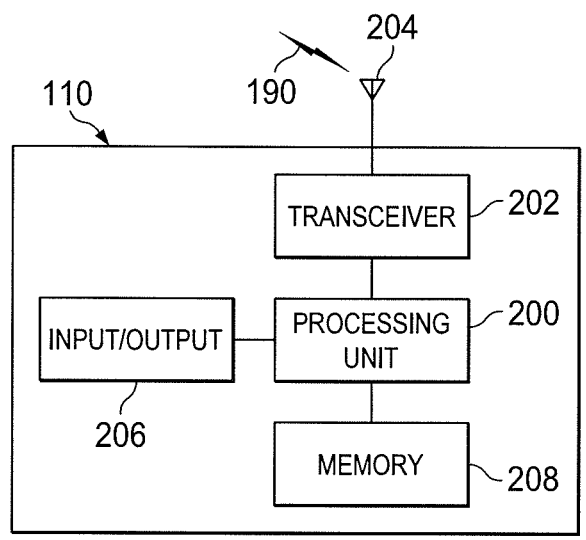
FIGS. 2A and 2B illustrate example devices that can implement WebRTC calls and correlate local media URIs between multiple browsers according to one embodiment.
Figure 2B:
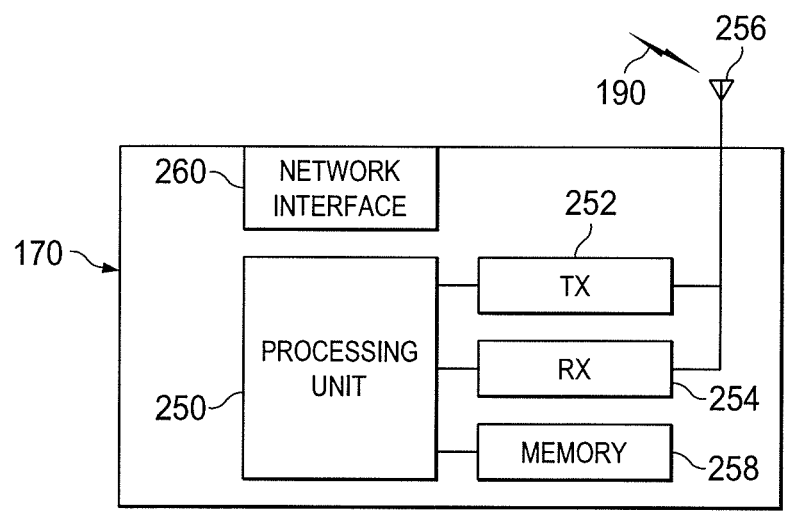

FIGS. 2A and 2B illustrate example devices that may implement the methods and teachings according to this disclosure. In particular, FIG. 2A illustrates an example ED 110, and FIG. 2B illustrates an example server 190. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the server 180 includes at least one processing unit 250, at least one transmitter 252, at least one receiver 254, one or more antennas 256, one or more wired network interfaces 260, and at least one memory 258. The processing unit 250 implements various processing operations of the server 180, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding EDs 110 and server 180 are known to those of skill in the art. As such, these details are omitted here for clarity.

Figure 3:
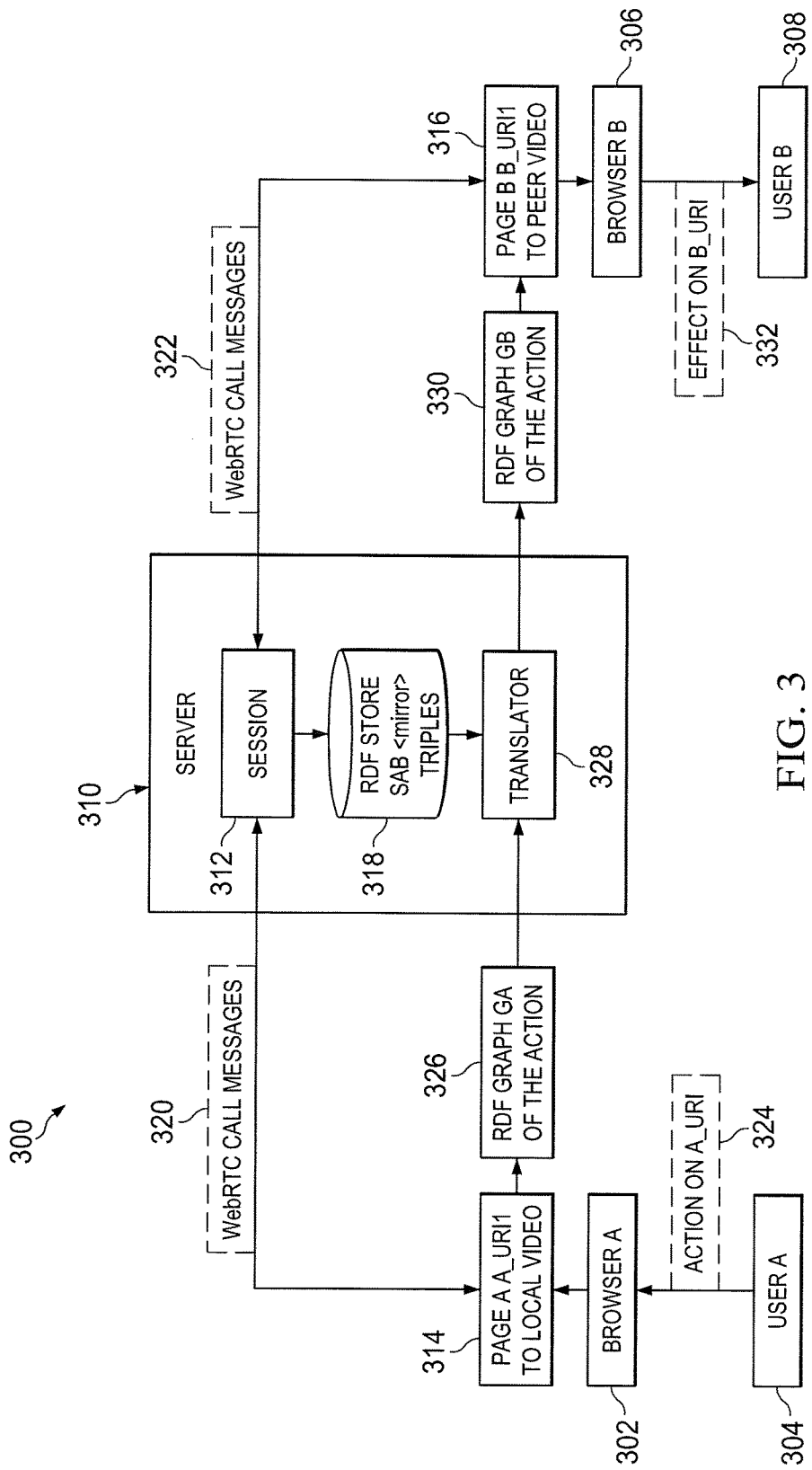
FIG. 3 illustrates a diagram of an illustrative architecture that can implement WebRTC calls and correlate local media URIs between multiple browsers within user devices according to one embodiment.

Turning to FIG. 3, there is illustrated an architecture 300 operable to establish and use media URI correlations. The architecture 300 includes a first web browser 302 (e.g., browser A) of a first user device 304, a second web browser 306 (e.g., browser B) of a second user device 308, and a server 310. As will be appreciated, the user devices 304, 308 may be two of the EDs 110 shown in FIGS. 1 and 2A.

A session 312 (or call) is established between the first and second web browsers 302, 306 and the server 310. For example, page A 314 associated with the browser A 302 and page B 316 associated with the browser B 306 may create a video session such that both A_URI and B_URI point to the video streams from User A's camera. To illustrate, the server 310 and the browsers 302, 306 populate a database store 318 (e.g., the SAB store) with <mirror> triples during a WebRTC call. During the session, WebRTC call messages 320 may be sent between the user A 304 and the server 310, and WebRTC call messages 322 may be sent between the user B 306 and the server 310. An action 324 related to a first URI (e.g., A_URI) is performed on the browser A 302 by the first user 304. The action 324 is encoded as an RDF graph 326 (e.g., RDF Graph GA) containing A_URI and sent to the server 310. A translator 328 within the server 310 translates the received RDF graph 326 to a second RDF graph 330 (e.g., RDF Graph GB) containing B_URI based on <mirror> predicate stored in the database store 318. The RDF Graph GB 330 is sent to the browser B 306 to render the effect 332 on B_URI.

Figure 4:
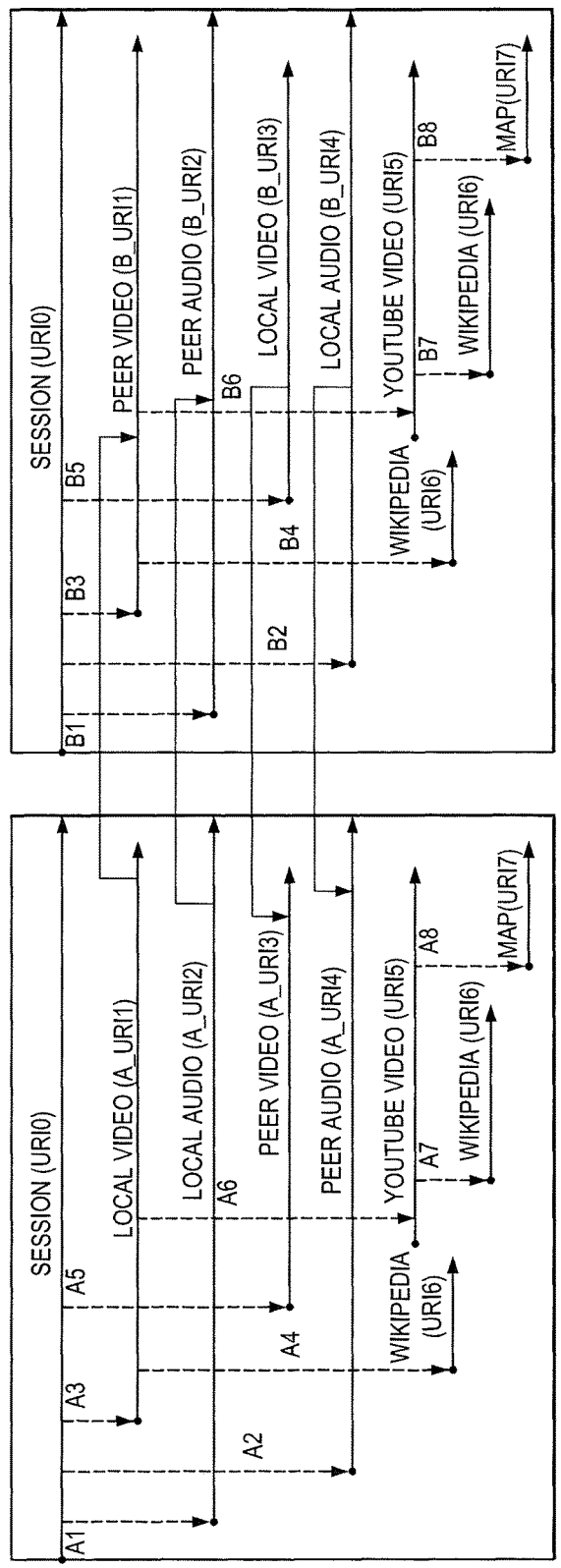
FIG. 4 illustrates a diagram of an illustrative example case of correlations using two media synchronization trees according to one embodiment.

FIG. 4 illustrates an example case of correlations using two media synchronization trees. User A's actions are sent to Browser B after translations. For example, at A4: user A links a Wikipedia page (URI6) to the local video (A_URI1), and the Browser B generates B4 (e.g., the peer video B_URI1) from A4. As another example, at A6: user A links a segment of YouTube video (URI5) to the local video A_URI1, and the Browser B generates B6 (e.g., the peer video B_URI1) from A6. As another example, at A7: user A links a Wikipedia page (URI6) to some segment of YouTube video (URI5), and the Browser B duplicates B7 from A7. As yet another example, at A8: user A links a map (URI7) to some segment of YouTube video (URI5), and the Browser B duplicates B8 from A8.

Figure 5:
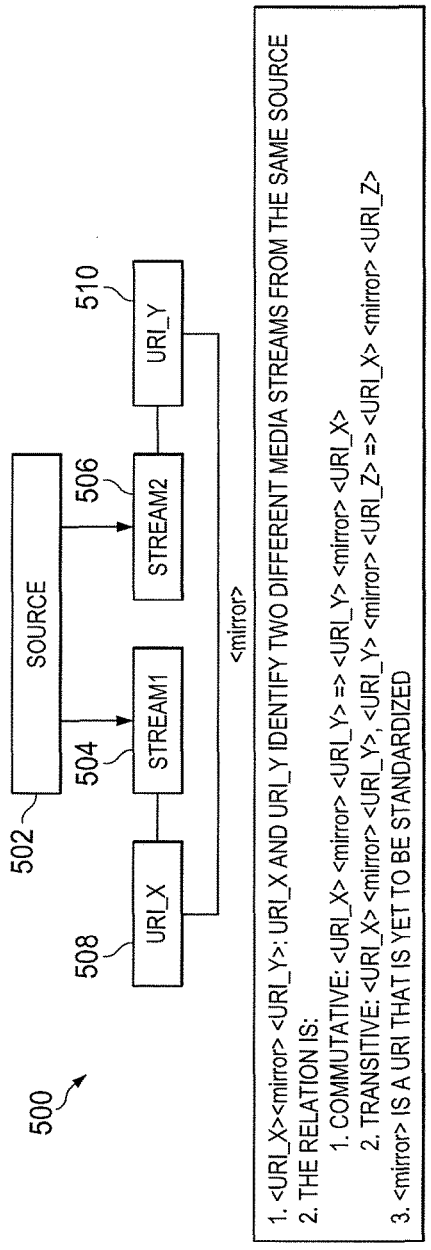
FIG. 5 illustrates a diagram of an illustrative <mirror> predicate according to one embodiment.

FIG. 5 illustrates a <mirror> predicate 500 including a source 502, a first media stream 504 (e.g., stream 1), a second media stream 506 (e.g., stream 2), a first URI 508 (e.g., URI_X) and a second URI 510 (e.g., URI_Y). In this illustration, the URI_X 508 and the URI_Y 510 identify two different media streams (e.g., the stream 1 504 and the stream 2 506, respectively) from the same source 502. The relations are:

Commutative:
    <URI_$X$><mirror><URI_$Y$>=><URI_$Y$><mirror><URI_$X$>

Transitive:<URI_$X$><mirror><URI_$Y$>,
    <URI_$Y$><mirror><URI_$Z$>=><URI_$X$><mirror><URI_$Z$>,
where <mirror> is a URI that is yet to be standardized.

In a particular embodiment, the source 502 may be the A camera: <A_URI1><mirror><B_URI1>. Alternatively, the source 502 may be the A microphone: <A_URI2><mirror><B_URI2>. Alternatively, the source 502 may be the B camera: <B_URI3><mirror><A_URI3>. Alternatively, the source 502 may be the B microphone: <B_URI4><mirror><A_URI4>.

Now turning to FIG. 6, there is illustrated a flow diagram 600 of URI correction during a WebRTC call in accordance with one embodiment of the present disclosure. The flow diagram 600 includes a first user 602 (e.g., User A) operating a first user device, a first browser 604 (e.g., Browser A) of the first user device, a server 606 (e.g., Web Server), a second user 610 (e.g., User B) operating a second user device, and a second browser 608 (e.g., Browser B) of the second user device. Each of the first and second user devices may correspond to one of the EDs 110a-110e of FIG. 1.

The web server 606 may include an operating system that provides executable program instructions for the general administration and operation of that server, and typically will include a computer-readable medium storing instructions that, when executed by a processor of the web server 606, allow the web server 606 to perform its intended functions. Suitable implementations for the operating system and general functionality of the servers are known or commercially available, and are readily implemented by persons having ordinary skill in the art.

According to the present disclosure, the Browser A 604 retrieves a page from the web server 606 and establishes a websocket connection (step 605) to the web server 606. Similarly, the Browser B 608 retrieves a page from the web server 606 and establishes a websocket connection (step 615) to the web server 606. Thereafter, the Browser A 604 retrieves content, such as the local video stream of the camera of the user device operated by the User A 602, and assigns a URI (e.g., A_URI1=local video) to the local video stream (step 620). In addition, the Browser A records a field identified as media stream identifier (MSID) that uniquely identifies the media stream and generates a correlation URI (e.g., A_corr=A_URI1, MSID) (step 620).

The User A 602 initiates a call to the User B 610 (step 625) via the Browser A 604, and the Browser A 604 sends an offer message to the web server 606 (step 630). The offer message includes a session description protocol (SDP) that includes the MSID. The web server 606 forwards the offer message to the Browser B (step 635), and the Browser B 608 sends an alert message to the User B 610 that alerts the User B 610 of an incoming call (step 640). If the User B 610 decides to answer the call, then an answer message is sent from the User B 610 to the Browser B 608 (step 645).

The web server 606 receives an answer SDP from the Browser B 608 to the Browser A 604 that includes a second SDP having the MSID (step 650). Thereafter, the web server 606 establishes a session resource between the Browser A 604, the Browser B 608, and the web server 606 (step 655).

Thereafter, the web server 606 generates the answer SDP from the Browser B 608 to the Browser A 604, where the answer SDP includes the MSID and a session time as determined by the web server 606 (step 660). In response to receiving the answer SDP, the Browser A sends an acknowledge message to the web server 606 and an RDF assertion that includes a triple (e.g., <A_URI> <corr> "{MSID}") indicating that the URI (e.g., A_URI) for this video for the Browser A is identified by this MSID (e.g., "{MSID}") (step 665). The triple includes a subject (e.g., <A_URI>, a predicate (e.g., <corr>, and an object (e.g., "{MSID}").

The web server 606 receives the acknowledge message and generates another acknowledge message to the Browser B 608 indicating that the Browser A 604 has received the answer from the Browser B 608 and including a second session time as determined by the web server 606 (step 670). In response to receiving the other acknowledge message, the Browser B 608 retrieves content, such as a peer video of the video stream of User A's camera, and assigns a URI (e.g., B_URI1=peer video) to the video stream (step 675). In addition, the Browser B 608 records the MSID and generates a correlation URI (e.g., B_corr=B_URI1, MSID) (step 675).

Up until this point, the Browser A has its own video, and the Browser B has received the video from Browser A and they would each assign the video stream a different URI (e.g., A_URI1 and B_URI1). Thereafter Browser B 608 generates an RDF assertion that includes a triple (e.g., <B_URI><corr>{MSID}) indicating that the URI (e.g., B_URI) for this video for the Browser B is identified by this MSID (e.g., "{MSID}") (step 680). The web server 606 receives Browser B's RDF assertion, and based on the common MSID of the RDF assertion of the Browser A 604 and the RDF assertion of the Browser B 608, the web server 606 is able to generate a new assertion that A_URI1 is a mirror of B_URI1 (e.g., <A_URI1><mirror><B_URI1>) (step 685).

Figure 7:
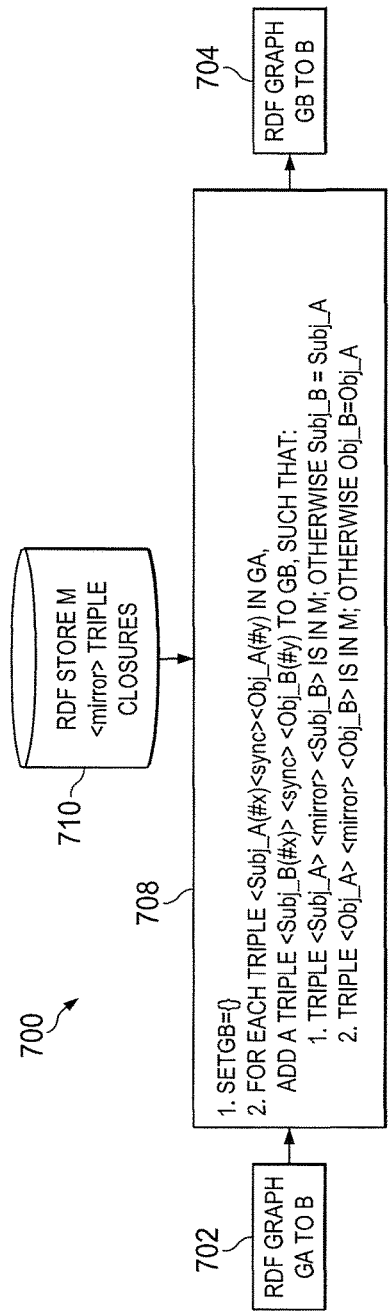
FIG. 7 illustrates a diagram of an illustrative RDF graph translation based on <mirror> according to one embodiment.

FIG. 7 illustrates the RDF graph translation based on <mirror> 700. An RDF Graph GA for an action 702 is generated and then translated via a translator 708 within database store 710 into an RDF Graph GB of the action 704 based on <mirror> predicate or triples stored in the database store 710. The translator 708 receives the RDF Graph GA 702 containing A_URI and creates an empty graph B (e.g., GB={ }). Thereafter, the translator 708 iterates over the triples in the RDF Graph GA 702 and searches for a matching pattern to a mirror relation in the database store 710 that contains B_URI. If a match is found, the translator substitutes the triple in the RDF Graph GA into the RDF Graph GB (e.g., substitutes A_URI into B_URI). Then the new triple is added to the RDF Graph GB 704. As illustrated, the translator 708 searches for a matching pattern for the subject, or a matching pattern for the object, or a matching pattern for both the subject and the object. Alternatively, the translator 708 may only search for a matching pattern for the subject.

Figure 8:
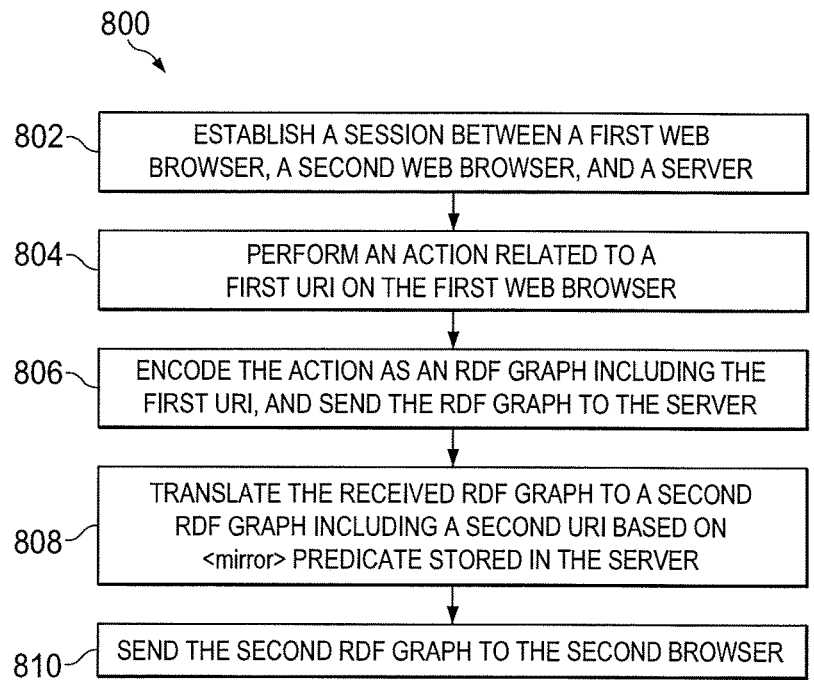
FIG. 8 illustrates a flow diagram illustrating a method of correlating local media URIs between web browsers according to one embodiment.

FIG. 8 illustrates a flow diagram illustrating a method 800 of correlating local media URIs between a first web browser of a first user device and a second web browser of a second user device.

A session is established between the first web browser, the second web browser, and a server, at 802. For example, the server 310 establishes the session 312 with the Browser A 302 and the Browser B 306.

An action related to a first URI on the first web browser is performed, at 804. For example, the Browser A 302 retrieves content, such as the local video stream of the camera of the user device operated by the User A 302, and assigns a URI (e.g., A_URI).

The action is encoded as an RDF graph including the first URI and the RDF graph is sent to the server, at 806. For example, the action 324 is encoded as an RDF graph 326 (e.g., RDF Graph GA) containing A_URI and sent to the server 310.

The received RDF graph is translated to a second RDF graph including a second URI based on <mirror> predicate stored in the server, at 808. For example, the translator 328 within the server 310 translates the received RDF graph 326 to a second RDF graph 330 (e.g., RDF Graph GB) containing B_URI based on <mirror> predicate stored in the database store 318.

The second RDF graph is sent to the second browser, at 810. For example, the RDF Graph GB 330 is sent to the Browser B 306 to render the effect 332 on B_URI.

Figure 9:
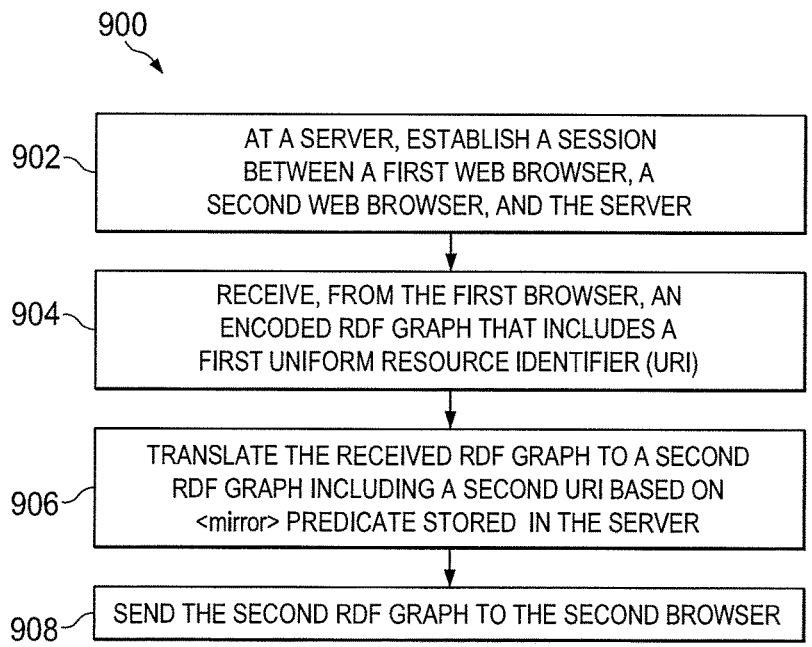
FIG. 9 illustrates a flow diagram illustrating a method of translating a resource description framework (RDF) graph according to one embodiment.

FIG. 9 illustrates a flow diagram illustrating a method 900 of translating a resource description framework (RDF) graph. At a server, a session is established between a first web browser, a second web browser, and the server, at 902. For example, the server 310 establishes the session 312 with the Browser A 302 and the Browser B 306.

An encoded RDF graph that includes a first uniform resource identifier (URI) is received from the first browser, at 904. For example, the Browser A 302 retrieves content, such as the local video stream of the camera of the user device operated by the User A 302, and assigns a URI (e.g., A_URI). An action is encoded as an RDF graph including the first URI and the RDF graph is sent to the server. For example, the action 324 is encoded as an RDF graph 326 (e.g., RDF Graph GA) containing A_URI and sent to the server 310.

The received RDF graph is translated to a second RDF graph including a second URI based on <mirror> predicate stored in the server, at 906. For example, the translator 328 within the server 310 translates the received RDF graph 326 to a second RDF graph 330 (e.g., RDF Graph GB) containing B_URI based on <mirror> predicate stored in the database store 318.

The second RDF graph is sent to the second browser, at 908. For example, the RDF Graph GB 330 is sent to the Browser B 306 to render the effect 332 on B_URI.

Various benefits are achieved by this process. Translations are independent of the RDF graph structure, and thus independent of applications. Translations are linear to the incoming graph size (number of triples).

In accordance with this disclosure, each web browser can maintain its own URI namespaces independently. The URIs generated by the web browsers remain opaque. The correlation mechanism is independent of web applications, and correlations can be established automatically during WebRTC calls. The established correlations can be used for further analysis and reasoning based on RDF.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of correlating local media uniform resource identifiers (URIs) between a first web browser of a first user device and a second web browser of a second user device, the method comprising:

establishing a communication session between the first web browser, the second web browser, and a server;

performing an action related to a first URI on the first browser;

encoding the performed action as a resource description framework (RDF) graph including the first URI and sending the RDF graph to the server;

translating the received RDF graph to a second RDF graph including a second URI based on a <mirror> predicate stored in the server by determining whether a pattern in the received RDF graph matches a pattern in the server that contains the second URI;

generating an empty graph;

scanning one or more triples in the received RDF graph; and in response to the pattern in the received RDF graph matching the pattern in the server that contains the second URI, substituting the triple in the received RDF Graph into the empty graph; and sending the second RDF graph to the second browser.

2. The method in accordance with claim 1, wherein establishing the communication session comprises:

generating Web Real Time Communication (WebRTC) messages between the server and the first web browser and between the server and the second web browser.

3. The method in accordance with claim 1, wherein encoding the performed action comprises recording a media stream identifier (MSID) field that uniquely identifies a media stream.

4. The method in accordance with claim 3, wherein encoding the performed action further comprises generating a correlation URI that includes the MSID.

5. The method in accordance with claim 1, wherein each of the one or more triples comprises a subject, a predicate, and an object.

6. The method in accordance with claim 1, wherein establishing the communication session comprises generating a session time as determined by the server.

7. The method in accordance with claim 1, wherein a relation of the <mirror> predicate is commutative.

8. The method in accordance with claim 1, wherein a relation of the <mirror> predicate is transitive.

9. A method of translating a resource description framework (RDF) graph, the method comprising:

at a server:

establishing a communication session between a first web browser, a second web browser, and the server;

receiving, from the first browser, an encoded RDF graph that includes a first uniform resource identifier (URI);

translating the received RDF graph to a second RDF graph including a second URI based on a mirror of the second URI, based on a <mirror> predicate stored in the server by determining whether a pattern in the encoded RDF graph matches a pattern in the server that contains the second URI;

generating an empty graph;

scanning one or more triples in the encoded RDF graph; and in response to the pattern in the encoded RDF graph matching the pattern in the server that contains the second URI, substituting the triple in the encoded RDF Graph into the empty graph; and sending the second RDF graph to the second browser.

10. The method in accordance with claim 9, wherein establishing the communication session comprises generating Web Real Time Communication (WebRTC) messages between the first web browser and between the server and the second web browser.

11. The method in accordance with claim 9, wherein each of the one or more triples comprises a subject, a predicate, and an object.

12. The method in accordance with claim 9, wherein establishing the session comprises generating a session time as determined by the server.

13. An apparatus for translating a resource description framework (RDF) graph, the apparatus comprising:

a processor; and memory coupled to the processor;

wherein the apparatus is configured to:

establish a communication session between a first web browser, a second web browser, and the apparatus;

receive, from the first browser, an encoded RDF graph that includes a first uniform resource identifier (URI);

translate the received RDF graph to a second RDF graph including a second URI based on a <mirror> predicate stored in the server by determining whether a pattern in the encoded RDF graph matches a pattern stored in the apparatus that contains the second URI;

generating an empty graph;

scanning one or more triples in the encoded RDF graph; and in response to the pattern in the encoded RDF graph matching the pattern in the server that contains the second URI, substituting the triple in the encoded RDF graph into the empty graph; and send the second RDF graph to the second browser.

14. The apparatus in accordance with claim 13, wherein the apparatus is further configured to generate Web Real Time Communication (WebRTC) messages between the apparatus and the first web browser and between the apparatus and the second web browser.

15. The apparatus in accordance with claim 13, wherein each of the one or more triples comprises a subject, a predicate, and an object.

\* \* \* \* \*